United States Patent [19]
Panzer

[11] Patent Number: 5,619,491
[45] Date of Patent: Apr. 8, 1997

[54] CDMA TRANSMISSION SYSTEM

[75] Inventor: Herbert Panzer, Nürnberg, Germany

[73] Assignee: U.S. Philips Corporation, New York, N.Y.

[21] Appl. No.: 381,997

[22] PCT Filed: Jun. 16, 1994

[86] PCT No.: PCT/IB94/00158

§ 371 Date: Apr. 3, 1995

§ 102(e) Date: Apr. 3, 1995

[87] PCT Pub. No.: WO94/29980

PCT Pub. Date: Dec. 22, 1994

[30] Foreign Application Priority Data

Jun. 16, 1993 [DE] Germany ............................ 43 19 830.9

[51] Int. Cl.⁶ .................................................... H04J 13/00
[52] U.S. Cl. .................................................................. 370/342
[58] Field of Search ............................. 370/18, 109, 118, 370/95.1, 95.3, 82, 83, 110.1, 19, 20, 21, 13, 17; 375/200, 205, 206, 207

[56] References Cited

U.S. PATENT DOCUMENTS

| 5,184,347 | 2/1993 | Farwell et al. | 370/95.1 |
| 5,455,822 | 10/1995 | Dixon et al. | 370/18 |

FOREIGN PATENT DOCUMENTS

| 5102943 | 4/1993 | Japan | H04J 13/00 |
| 9215164 | 9/1992 | WIPO | H04L 27/30 |

Primary Examiner—Wellington Chin
Assistant Examiner—Huy D. Vu
Attorney, Agent, or Firm—Leroy Eason

[57] ABSTRACT

A CDMA transmission system wherein a data sequence which is to be transmitted is frequency band spread by multiplying the data words therein by selected code words. In order to minimize the necessary bandwidth, a frame structure is established and the spread spectrum data words are compressed into data bursts each of which is included in one or more time slots of a data frame. Within a frame a data burst is located at a particular time delay $t_0$ following commencement of the frame and has a duration $t_d$ corresponding to the bit rate of the data burst.

6 Claims, 6 Drawing Sheets

CDMA TRANSMISSION SYSTEM

BACKGROUND OF THE INVENTION

1. Field of the Invention

The invention relates to a CDMA transmission system comprising a transmitter in which a data sequence is spread by a code sequence, and a receiver in which the original data sequence is recovered by a detector.

The invention likewise relates to a receiver and a transmitter for a CDMA transmission system.

2. Description of the Related Art

In a transmission system based on Code-Division Multiple Access (CDMA), the signals of different users are simultaneously switched to a common frequency band and transmitted with a common carrier frequency. Code-division multiple access systems are based on a spread band technique, i.e., the signal to be transmitted is spread over a frequency band which is considerably broader than the least required frequency band for a signal transmission. The band spreading renders code-division multiple access systems generally highly resistant to interference.

For frequency band spreading in code-division multiple access systems each (payload) bit to be transmitted is multiplied by a codeword agreed upon by transmitter and receiver. For distinguishing from the bits of the payload data sequence to be coded, a bit of the codeword is generally referenced a chip. The use of suitable codewords precludes, in principle, mutual interference of the signals of the individual users.

For obtaining a specific bit error rate with CDMA technology, at a given interference power the signal power must be approximately proportional to the transmit payload bit rate. In CDMA systems, in which the individual users use different payload bit rates depending on the application, for example, coded speech transmission, facsimile transmission, and so on, it is desirable for reasons of economic use of frequencies to load the CDMA transmission system only with the necessary frequency bandwidth.

For example from WO 92/15164 such a CDMA transmission system is known in which a programmable clock generator is provided for obtaining a variable bandwidth, by means of which generator the chip clock rate of each selected codeword is predefined. The higher the chip clock rate is selected, the broader is the resultant bandwidth of the spread transmit signal.

For practical reasons the chip clock rates are selected to be in multiples of a basic clock rate. In the preferred embodiment of said Patent application the bandwidth is therefore 1.2 MHz or a multiple thereof.

SUMMARY OF THE INVENTION

It is an object of the invention to provide a CDMA transmission system which makes a very great flexibility of the system possible.

This object is achieved in that a frame structure is provided and the payload information to be transmitted in a frame is compressed into signal bursts.

The transmit data occurring in a frame can thus be concentrated into a burst, while the frame length-to-burst duration ratio indicates the attained compression factor. This also permits very different and finely graded compression factors to be achieved. For very high payload data rates continuous transmission may be effected, as before, using the overall frame length as a burst. However, on the other hand, for low-rate payload data only a section of the frame is used.

A burst in a frame is characterized by frame-relative starting instant $t_o$ and an associated duration $t_a$. These parameters can be selected to depend on the system or on the link, due to the selectable spreading, but, in addition, also be variably changed in a link. Suitable measures such as, for example, controlled predefinition of the starting instant $t_o$ by the fixed station, or also random selection of the starting instant $t_o$ for the sending station itself, may be applied so that the frames are filled as uniformly as possible to provide thus a balanced economic use of frequencies.

In a highly advantageous embodiment of the invention the spreading factor is selected in dependence on an original payload data rate. It is then possible to provide different payload bit rates with a constant output bit rate, a so-termed chip rate.

When the same payload information is to be transmitted in a condensed burst, the result is that the bit rate of the time-compressed payload data is increased in inverse proportion to the burst length-to-frame length ratio. To achieve the appropriate bit error rate for this increased bit rate, according to a further embodiment of the invention the power is increased in proportion to the compression factor.

Briefly stated, the fact that spreading factors can be selected or even be variably set is used to exchange power for burst duration, as required.

An essential characteristic feature of mobile radio based on CDMA is that especially in the transmit direction to fixed station the signals, which have to the same payload bit rate, are to be received with the same power, and the noise power of adjacent cells should only amount to a part of the total received power. In a link between, for example, small cells and superimposed large cells, this condition cannot be satisfied, because a sufficient power adaptation of a small cell in the neighbourhood of the large-cell fixed station is impossible as a result of the considerably larger send power of the large cell.

Different operators will generally install their radio cells in uncoordinated fashion. This may lead to problems, if the cell boundaries of one operator exactly coincide with the position of the fixed stations of the other operator. In such a case it will not be possible to effect a suitable power adaptation, because in each case, at least in a fixed station, the noise power will be considerably higher than the payload signal power.

To solve this problem the invention proposes to select a position $t_o$ of the beginning of a burst in dependence on the cell size. In this manner the burst ranges in which small cells operate can be separated from the ranges of the frames in which large cells operate. Interference owing to different transmit powers is then largely precluded. The limit between the bursts can be defined with the necessary safe distances determined by the situations, while the radio traffic ratio in the different cell categories (small cell to large cell, and so on) is the decisive parameter.

An extremely simple solution is provided if the frames for all the cell categories are synchronized, which, however, can be guaranteed with a suitable arrangement (for example, a mobile switching centre such as in GSM) and signalling links.

With different uncoordinated operators there would be impermissible interference, because frame synchronization cannot then be presupposed then. To solve this problem the invention proposes to determine a suitable and better usable time domain in a frame and per cell by measuring a field strength distribution in a frame in the fixed or mobile station.

Advantageously, the frame is subdivided for this measurement into time slob to which the measurement is related. The burst is then selected so that it covers, for example, a number of successive time slots depending on the information to be transmitted. A special variant is the allocation of exactly one time slot for each burst.

Mobile radio systems are based on a duplex transmission having the directions of downlink (fixed station to mobile station) and uplink (mobile station to fixed station). The two directions of transmission may be separated in the frequency domain (FTD) or in the time domain (TDD). Data services gaining in importance stand out in that the payload bit rates in the two directions may show extremely different values (asymmetrical links). Some of these links are implicitly taken into account in CDMA in that an adapted spreading factor is selected and transmission takes place with accordingly adapted power. However, if the asymmetry holds for entire cell environments, for example, because the range of services especially comprises distribution services, different bandwidths from the radio resource are to be allocated to the two transmission arrangements. Let us assume that FDD is, for example, 500 kHz for the uplink and 4 MHz for the downlink. As frequency domains are generally subjected to a global planning, which must take a multiplicity of users into account, this set-up is not very flexible.

In a further embodiment the invention proposes to separate the directions of transmission (downlink/uplink) between transmitter and receiver as a function of time, while an element of time can be variably defined for each direction of transmission.

When a separation with time (TDD) is used, it is locally left up to the individual operator to what extent he uses his frequency band for the two directions of transmission. According to the basic principle it is possible that the burst length is variably adapted in accordance with the mean bit rates for the two directions (while, additionally, the necessary bit error rate is taken into account).

This adaptation cannot be performed separately for each individual link, because otherwise overlapping and thus impermissible interference occurs either on the side of the fixed station or the mobile station. This is not necessary either, because occasional exceptions are taken into account by a relatively adapted power. An overlapping may also be impermissible for adjacent cells, because either an adjacent fixed station (in so far it has a higher transmitter power than a mobile station) can interfere the reception of a mobile station, or the reception of the fixed station is interfered on the cell boundary by an adjacent cell mobile station positioned in the vicinity. Therefore it is appropriate to coordinate a change of boundaries for the two directions by a suitable common controller as described hereinbefore. Apart from this, there is still the possibility of regarding neighbouring cells as uncoordinated and implementing the decentralized measuring method which has also been described hereinbefore.

It has already been observed that a pure CDMA system is not sufficient to realize a sufficient separation of the users in all cases. The invention therefore proposes to make an additional separation in the time domain. The invention also proposes as a further alternative to communicate temporarily in different frequency domains, for example, for performing a handover.

By compressing the payload data in at least two bursts having the same contents, it is possible in this way to transmit in a time-frame the same information both in a first frequency band and in at least a second frequency band in succession.

BRIEF DESCRIPTION OF THE DRAWINGS

The invention will now be further described and explained with reference to the embodiments shown in the drawings, in which.

DESCRIPTION OF THE PREFERRED EMBODIMENTS

Figure 1:
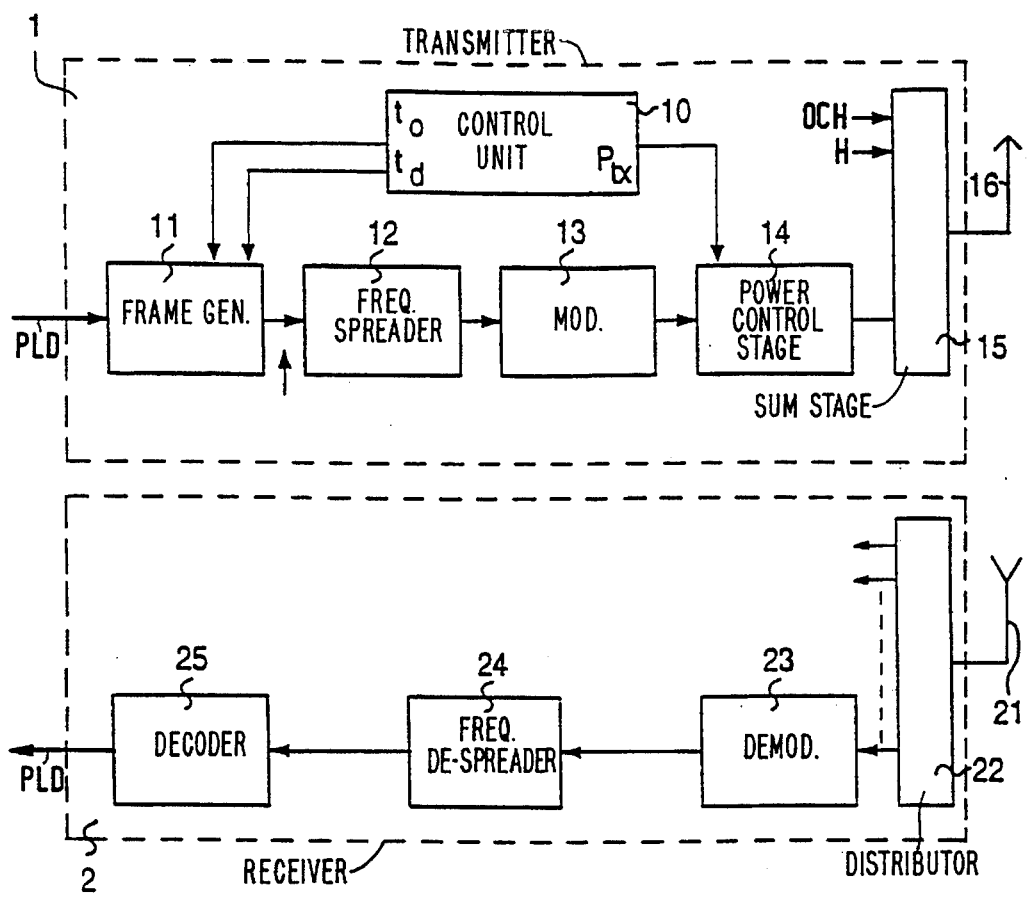
FIG. 1 shows a CDMA transmission system comprising a transmitter and a receiver.
Figures 2A, 2B:
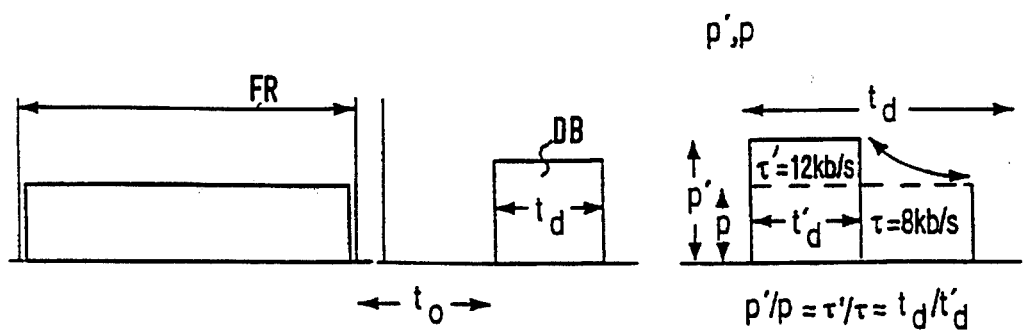
FIG. 2a shows a frame structure of the CDMA system.
FIG. 2b shows the correlation between dam rate, burst duration and received power.

FIG. 1 shows a CDMA radio system, for example, a radio system for mobile communication, comprising a transmitter 1 and a receiver 2. Transmitter 1 and receiver 2 use a time frame FR (FIG. 2a) which is subdivided into equally long time slots (not shown). In each time slot a payload data block (PLD) is transmitted. This presupposes the use of block-structured dam, or the subdivision of a continuous payload data stream (for example digitized speech signals) into data blocks having the same length in time. Depending on the data transfer rate of the original payload (for example, speech signal, facsimile data, alphanumeric messages, and so on), there are thus different-size data blocks available for transmission for each time slot of the transmit frame.

The payload PLD to be transmitted is applied in digitized form to a frame generator 11. A data stream arriving at the frame generator 11 can be buffered in blocks by storage means before the data blocks are transferred to a subsequent frequency spreader 12.

The processing and buffering of the block-structured data cause delays to occur. For these delays not to become perceptible in speech signals, a frame length of 10 ms was selected in the exemplary embodiment.

Each buffered payload data block is compressed into a data block DB having a time duration of $t_d$, achieved by the frame generator 11 changing the data rate when the blocks are transferred to the spreader 12. This compressed dam block DB will be referenced a burst or CDMA-burst hereinafter to distinguish it from the original payload data block.

In known fashion the data bits of the burst are spread in the spreader 12 by a multiplication by a multi-digit code word, so that with a subsequent modulation of the spread signal in a modulator 13, a signal is developed having an accordingly higher bandwidth than the signal that is not spread. This spread signal is subsequently subjected to power control in a power control stage 14 before it is combined with other channels OCHH to form a sum signal in a summation stage 15 and which is transmitted over an antenna 16.

The length in time $t_d$ of a burst, the instant $t_o$, referring to the start of a frame and also the transmitter power $P_{tx}$, with which a burst is transmitted, are predefined values for the frame generator 11 and the power control stage 14 produced by a control unit 10. The transmitter power $P_{tx}$ is controlled such that a specific received power p is produced at the receiver 2. Advantageously, the transmitter power $P_{tx}$ is to be selected so that the received power p is proportional to the selected data transfer rate $\tau$ of the transmit burst. This means that if the length in time $t_d$ of a burst is selected to be shorter with the same payload block size, the control unit 10 is to select the transmitter power $p_{tx}$ accordingly higher to guarantee an accordingly higher received power p (cf. FIG. 2b). With p', $t'_d$, and $\tau'$, a different received power, a different selected data transfer rate and a different length in time are indicated, respectively. In the example given, $\tau=8$ kb/s, and $\tau'=12$ kb/s.

In the receiver 2 the signal mixture received via an antenna 21 is distributed over the individual signal processing circuits by a signal distributor 22. One such signal processing circuit is provided for each receive channel or subscriber, respectively. In each signal processing circuit the signal is first demodulated in a demodulator 23 and de-spread in known fashion in a de-spreader 24. The distinction between channel and subscriber is made here by the use of the code word used at the transmitter end. In a decoder 25 the original payload signal PLD is reconstructed from the received bursts.

An essential characteristic feature of a suitable mobile radio system based on CDMA is that at a fixed station the signals from the individual subscribers, with regard to the same payload bit rate, are ideally to be received with substantially the same power, to guarantee optimum separation of the individual signals. However, the signals received from adjacent cells, which signals will collectively be denoted noise power in the following, form part of the total received power. Therefore, the equal power condition cannot be maintained in a CDMA radio system formed by large and small cells, because due to the considerably larger transmitter power of the large cell, an adequate adaptation of the power in a small cell located in the neighbourhood of the large cell is not possible.

Figure 3:
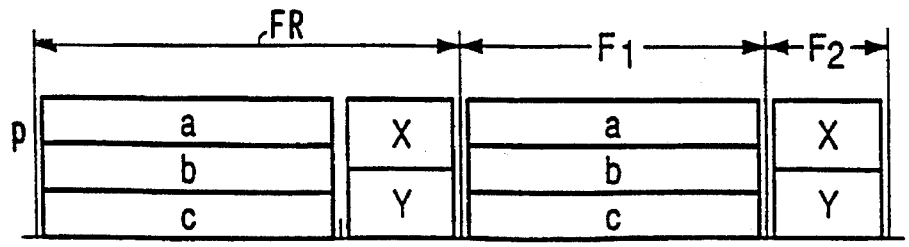
FIG. 3 shows burst distribution in a frame in small cells and large cells.

Here the concept according to the invention can be used for defining, in a frame FR, at least a coverage area $F_1$ of their own for the small cells which are separated from at least coverage area $F_2$ for large cells (see FIG. 3). The payload signals from small and large cells are thereto compressed into bursts, so that they can be transmitted in the appropriate sub-frames $F_1$ and $F_2$, respectively.

The division into small cell burst and large cell burst causes the noise power received from a fixed station of a small cell to be restricted exclusively to other small cells, and the noise power received from a fixed station of a large cell to be restricted exclusively to other large cells. The bursts a, b, c of the small cells are transmitted at a lower data rate than the bursts X, Y of the large cells, while for the same data rates of the basic payload signals an accordingly longer burst period is provided, so that the transmission of the bursts a, b, c of the small cells needs only a relatively small transmitter power. As a result, the noise power received from other small cells is also small, even if the small cells are proximal cells. For the subscribers of the large cells, on the other hand, a higher compression rate with appropriately higher power can safely be selected, because the enlargement of a large cell provides an equivalent protection ratio in neighbouring large cells.

Figure 4:
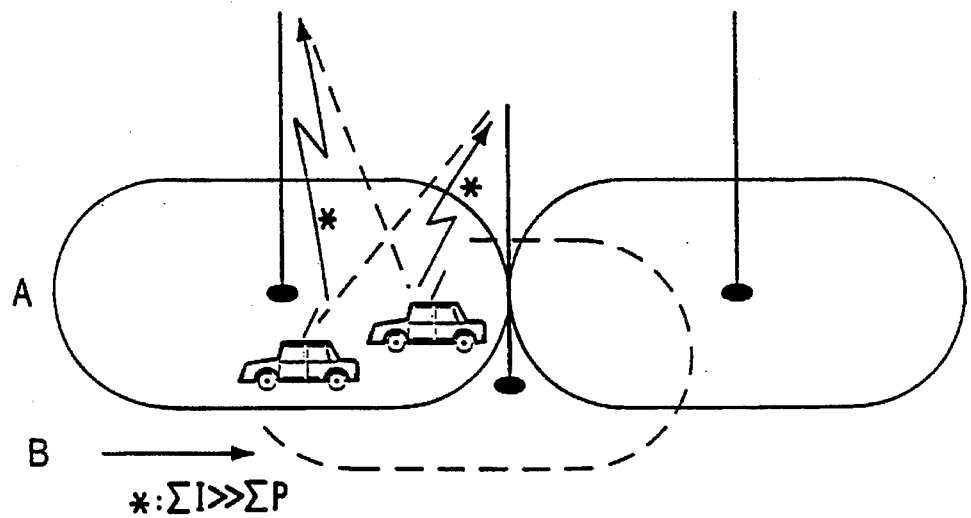
FIG. 4 shows the situation of interference with local superpositioning for at least two CDMA systems in the same frequency band.

FIG. 4 shows another undesired noise situation in which two different operators A and B of two independent CDMA radio systems, which are to use the same frequency band, however, and distinguish the subscribers only by different codes, have receiver stations located in uncoordinated fashion. A worst-case situation may arise when the operator B has located his fixed station on the cell boundary of the radio cell of operator A. As a result, it will not be possible to effect a suitable power matching, because at any rate at least in a fixed station, the noise power caused by the other operator is considerably higher than the power of the payload signal of its own subscribers. An * indicates interference, in that when the sum of interference power $\Sigma I$ is much greater than the sum of payload power $\Sigma P$, this indicates that no control is possible.

A synchronization of all the operators in the event of mutually independent operators is very costly. A sub-frame for each operator, separate from the other operators, like the separation described hereinbefore of a frame for small and large cells, is therefore not always the most practical solution. Without a common frame synchronization, however, interference signals occur that cannot be permitted.

Figure 5:
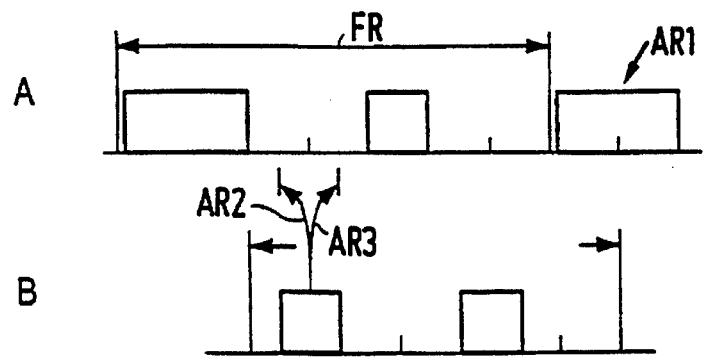
FIG. 5 shows the occupancy of a frame by bursts in a CDMA system having different not mutually synchronized users.
Figure 6:
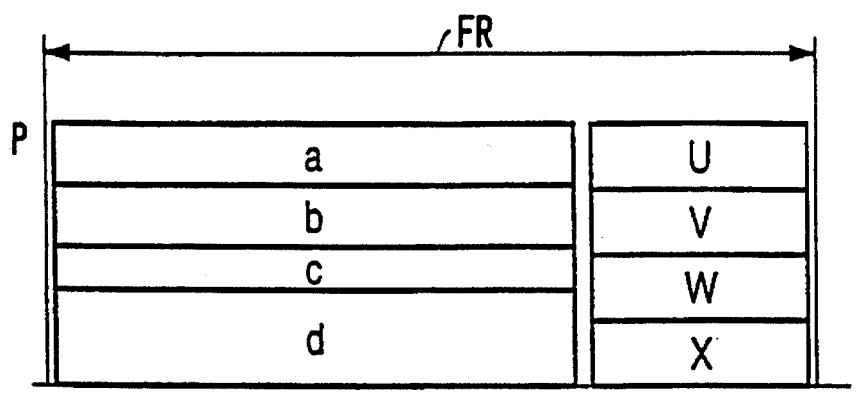
FIG. 6 shows an example of an application to asynchronous operation (different dam rates for downlink and uplink)

In a further embodiment there is assumed that the individual operators transmit their data preferably in equally long, but mutually independently selected frames FR. Preferably, the frames FR are subdivided into equidistant time slots, while each user operates in the burst mode i.e. uses one or more time slots with an accordingly higher transmitter power for transmitting the data of its subscribers. A use of the whole frame length is deliberately dispensed with. In this manner, unused or little-used regions occur in a frame. By measuring the field strength distribution in a frame, each fixed station of each operator and, optionally, also the mobile stations concerned can find unused time slots and select for transmission a number of successive vacant time slots in dependence on the information volume to be transmitted (see FIG. 5). The selection of data transfer rate and transmitter power makes it possible to adapt the data volume to be transmitted to the number of time slots available. An arrow AR1 indicates a burst seizing two consecutive time slots, and arrows AR2 and AR3 indicate seizure after measurement.

In a further embodiment, different payload bit rates are used for the transmission from fixed station to mobile station (downlink) and from mobile station to fixed station (uplink) (asymmetrical link). A rather large pan of a frame is used for the direction that requires the higher payload data rate and the other pan of the frame is used for the other direction. Since in this case the time-dependent limits of the sub-frames are preferably given a fixed value, it is possible, in the sub-frames to adapt the actually necessary payload data rates again via the transmitter power. For example, in FIG.

6, in which burst d needs to have a higher payload bit rate than bursts a, b and c, the transmitter power of the burst d for the downlink is selected such that it is received with an accordingly higher received power. The received powers of the bursts U, V, W, X for the uplink, on the other hand, are controlled, due to the corresponding data rates, so that they are received all with the same receiver power by the fixed station.

Figure 7:
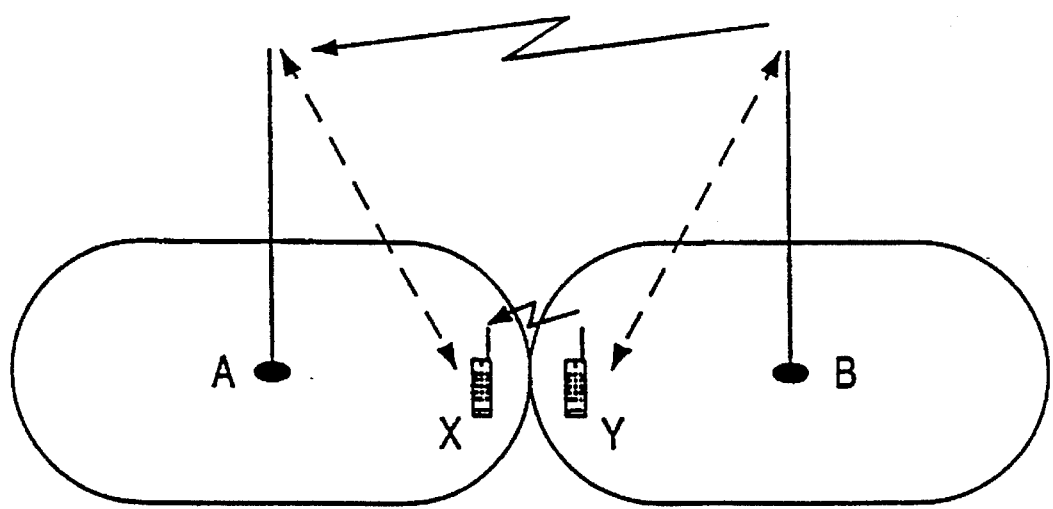
FIG. 7 shows a situation of interference.

Preferably, the division into downlink and uplink sub-frames within the whole CDMA system should be the same, as it may otherwise lead to interference situations shown in FIG. 7. In FIG. 7, operator B interferes due to higher transmitter power, and band Y of indicated bands X and Y interferes due to proximity. With different widths of down-link and uplink sub-frames there would be an overlap in time of a part of the downlink sub-frame of a radio cell with a part of the uplink sub-frame of the other radio cell. In that case a fixed station could interfere with its neighbouring fixed station, or mobile stations on the cell boundary transmitting with more power due to their maximum distance from their fixed station, could interfere with a nearby mobile station of the neighbouring cell. It is thus also advantageous in this case to have a synchronized subdivision of downlink and uplink sub-frames within the whole CDMA system or, as already described before with respect to the simultaneous use of large and small cells, to have a subdivision of the frame into many time slots with a field strength measurement before a vacant time slot is occupied.

In a further embodiment there are at least several transmitters working with different frequency bands. For mutually distinguishing the individual radio cells a pilot signal is provided which is transmitted by the individual transmitters. In this embodiment it may be necessary in the course of a call to change frequency bands, for example:

(1) If different cell categories have been assigned different frequencies, and during a call, a handover is to be effected, for example, from a small to a large cell. In that case the pilot signal of the large cell has a different frequency from the pilot signal just used in the small cell;

(2) CDMA frequency bands have a minimum of, for example, 500 kHz, because it is only then that a sufficient number of subscribers are simultaneously available to make an efficient use of the code superpositioning possible. For operators of small networks, characterized, for example, by the uncoordinated use of cordless private branch exchanges (of which certainly a plurality of exchanges can be present in an office building), or, in an extreme case, simply by users of cordless telephones, the assignment of a frequency band to each operator is not efficient. These operators must therefore share frequency bands but there must be a possibility to change dynamically to another frequency band if the noise situation changes;

(3) Situation in which a handover to a neighbouring cell is desired, but this cell prefers to have a different frequency domain;

(4) In a CDMA system it is generally possible to use the same frequency range in a station's own cell and in neighbouring cells. However, this no longer holds if the spreading factor becomes small as a result of very high payload bit rates. In this case too it is necessary to change dynamically to other frequencies.

The change to another frequency has a twofold requirement:

Measuring and identification For example, the recognition of possible neighbouring fixed stations on the basis of the pilot signal, with simultaneous field strength measurement, or a measurement of the noise power in a possible frequency domain for the handover.

Exchange of signalling information. This may be effected as a so-called forward handover in which the exchange of information is already effected with the new frequency. This transition is fast, because from the transition onwards, payload can be transmitted already at twice the rate of the previous frequency and, in the other direction, when the handover is received correctly, a termination is effected by a terminated previous link. A characteristic feature here is that the link exists for a specific period of time with two frequencies. The advantage is that no payload is lost (seamless handover). The second possibility is that the signalling is to be carried out as much as possible with the old frequency. This method is slower, because mobile and new cells are first to be fully matched before a change-over can take place. The mobile station, besides receiving with the new frequency, however, is also to send with this new frequency to verify the uplink. This is to say that parallel transmission and reception activities are to take place with the new and old frequencies if the transmission of payload is to be effected seamlessly.

These considerations are analogously valid for the subdivision with respect to time. The difference is, however, that for the parallel operation of two time slots one transceiver will suffice, but not for two different frequencies.

However, more than one transceiver is a considerable increase of cost and current consumption, more specifically, in the mobile station. Therefore, the restriction to a single transceiver is to be desired at least for simple (telephone) mobiles. For the use as "cordless telephone" it may also be advantageous to use only one transceiver for the fixed station. This is considered an additional option. For the moment there is assumed that only the mobile station is restricted to a single transceiver.

Figure 8:
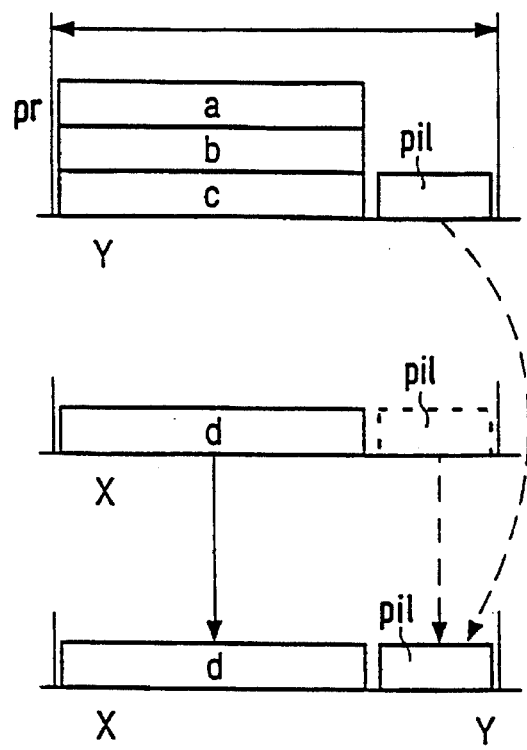
FIG. 8 shows the use of separate bursts for payload signal and pilot signal.

Downlink Considerations are as Follows a) Identification of Candidates for a Change of Cells In mobile radio systems there exists a reliable method of having each fixed station transmit its identification code (pilot signal) over a pilot channel. By measuring the power received from the pilot channels and decoding the identification codes, a mobile then obtains the essential information for a change of cells. In a CDMA system the pilot channels are commonly separated by their codes and may, therefore, lie in the same frequency band. But, as described hereinbefore, there are exceptions in this respect: with different cell sizes and in uncoordinated environments of a plurality of operators. The pilot channels will then lie in different bands. A solution with only a single transceiver is found as shown in FIG. 8: payload and pilot information a, b, and c, and pil, respectively, is transmitted in time consecutive bursts. On the receiver side it should be possible when the payload is received to change the frequency band to receive pilot signals in different frequency bands.

The receiver of the mobile of FIG. 8 first receives the payload burst d from frequency band X and then changes its receiver, so that in the same time-frame it subsequently receives the pilot signal pil from frequency band Y. In FIG. 8 a relative power pr is indicated. The upper part of FIG. 8 relates to a transmitting situation in a large cell, the centre part of FIG. 8 relates to a transmitting situation in a small cell, and the lower part of FIG. 8 relates to a receiver in a mobile.

Figure 9:
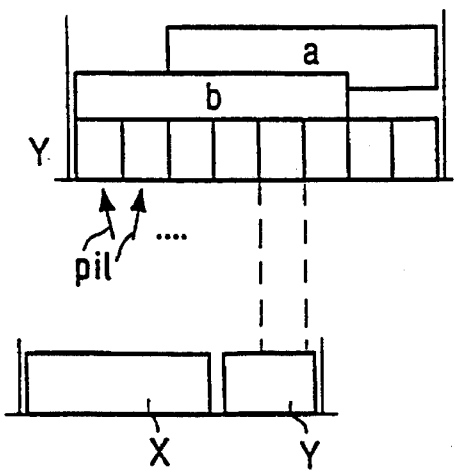
FIG. 9 shows the use of a plurality of pilot signals superimposed on the payload signal in the event of non-synchronized cells.

The embodiment shown in FIG. 8 is preferably to be used in a fully synchronized CDMA radio system. With a non-synchronized CDMA radio system the embodiment shown in FIG. 9 is to be recommended. The pilot signals pil in the radio cells conveying a pilot signal are superimposed in consecutive bursts on the other payload signal bursts. The receiver, once it has received its payload signal burst, switches to the other frequency band to receive a pilot signal burst transmitted consecutively. To receive a complete pilot signal burst, the time slot provided for receiving the pilot signal burst should be at least twice as long as a pilot signal burst.

b) Identification of Candidates for a Change of Frequency

For this purpose, frequencies having the smallest possible field strength (and thus less expected noise power) are to be found. However, a condition is that the field strength does not fluctuate too strongly during a frame period (one may consider, for example, that in FIG. 8 another operator who does not use a pilot signal and happens to be synchronized) transmits with a certain frequency. There are two solutions:

The transmitter powers for the two bursts are compared with a maximum. This is a waste of spectrum, or the bursts are adapted dynamically, so that a measurement may be made over the whole frame.

Figure 10A:
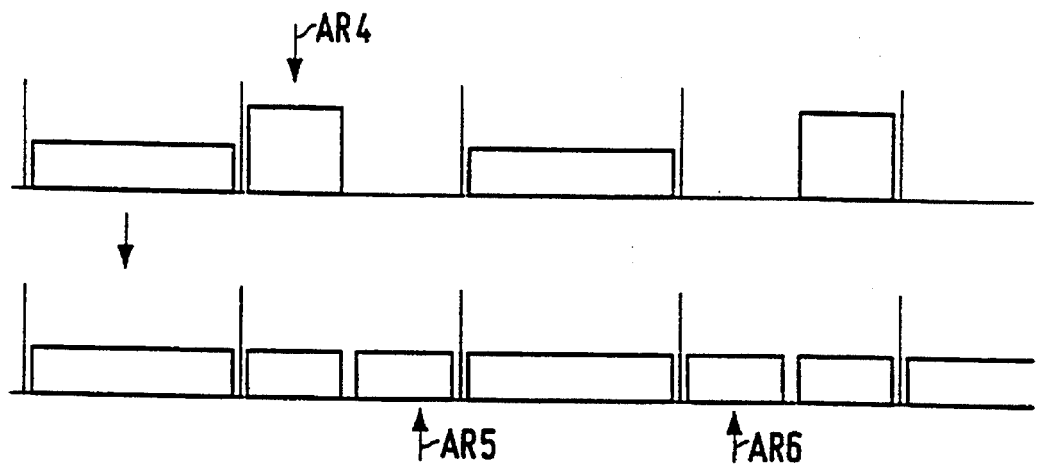
FIG. 10 shows the use of compression of payload data blocks for the creation of measuring time slots.

FIG. 10a shows an embodiment in which, for example, the transmission of payload data is effected over a full time-frame in the transmitter. In the next time frame the payload data block is then compressed to a burst, so that after reception of the burst there is ample time for the receiver to carry out measurements in other frequency bands for the rest of the time frame. A direct consequence of the compression of the payload data block is a higher transmitter power for the burst as is again apparent from FIG. 10a. The upper part of FIG. 10a relates to a transmitter, an arrow AR4 indicating an increased data rate, and the lower part of FIG. 10a relates to a receiver, arrows AR5 and AR6 indicating measurement of other frequencies.

Figure 10B:
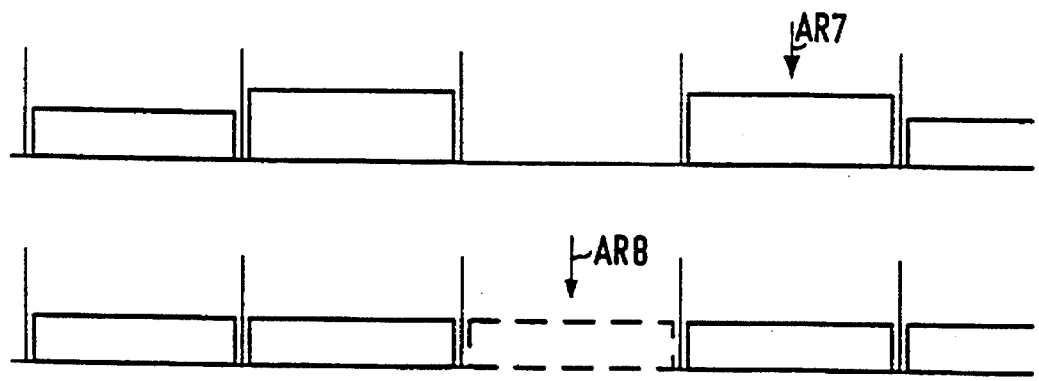

A derived embodiment is shown in FIG. 10b. In the second time frame both the payload data block for the second time frame and the payload data block for the third time frame are transmitted instead of the payload data block assigned to the second time frame, so that for the receiver the third time frame is fully available for measurements from then on. The upper part of FIG. 10b relates to a transmitter, an arrow AR7 indicating an increased bit rate, and the lower part of FIG. 10b relates to a receiver, an arrow AR8 indicating measurement.

c) Procedure of a Seamless Handover

Figure 11:
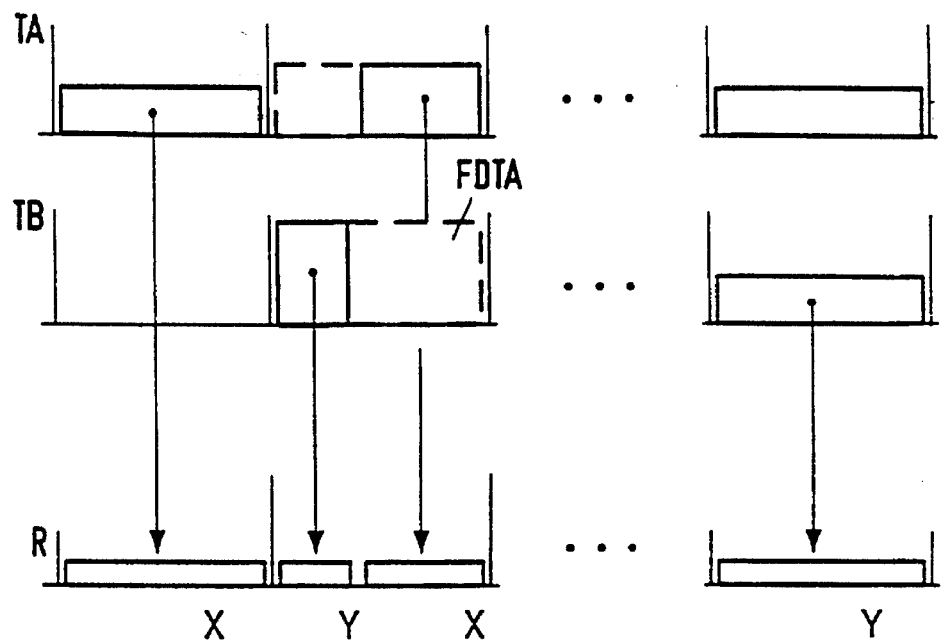
FIG. 11 shows the use of two transmitters for transmitting burst signals in different frequency bands when only a single receiver is needed.

A transitionally overlapped transmission on the downlink can be achieved in that the payload of the previous link is concentrated in a part of the frame and is transmitted via a first transmitter TA (cf. the embodiment shown in FIG. 11). A second transmitter TB, which may belong to the same fixed station, or to a different fixed station, concentrates the same payload in the complementary part. The use of two transceivers makes it possible to have the same transmitter powers over the whole frames, similarly to above. The subdivision of the frame may be variable. This may lead to achieving that if the former frequency is abandoned owing to, for example, overload, the transmitter power is to be slightly increased because of a slightly increased compression factor, whereas the new, still undisturbed frequency, is capable of handling more power and can therefore be loaded with a very high compression factor.

Uplink Considerations are as follows.

In FIG. 11 a receiver R and further optional filler data FDTA are indicated. The selection of candidates for the change of cells is omitted here.

a) Identification of Candidates for a Change of Frequencies

In simple duplex links with symmetrical payload there are certain correlations with respect to the noise power on the uplink or downlink, although large deviations occur due to the non-reciprocal situation of mutually interfering mobiles or fixed stations, respectively. The two directions of transmission present an independent behaviour only when strongly asymmetrical payload bit rates occur. At any rate the noise power with a frequency for the downlink is to be measured separately. No division with time is necessary here, because the fixed station is assumed to comprise a separate measuring receiver.

b) Procedure of a Seamless Handover

Figure 12:
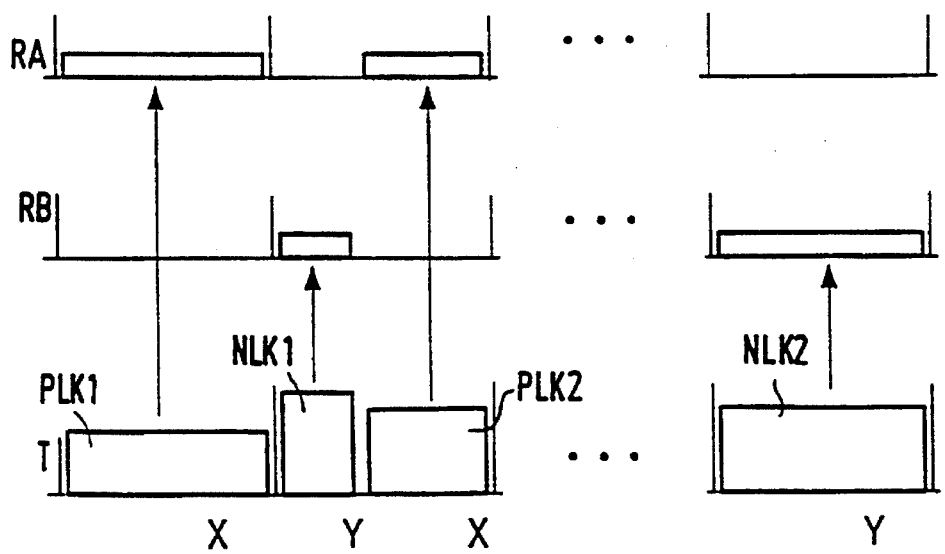
FIG. 12 shows the use of a single transmitter for transmitting burst signals in different frequency bands when two separate receivers are needed.

In this embodiment shown in FIG. 12 the mobile station transmits during the handover each consecutive transmit payload data block in a time frame both in the new frequency band Y and in the old frequency band X, T indicating a transmitting mobile. For this purpose, the payload data block is compressed accordingly, so that it can be transmitted twice per time frame instead of once per time frame. The compression in its turn requires accordingly increased transmitter powers. At the fixed station there is a separate receiver RA, RB for each frequency band X, Y, respectively. This twofold transmission is continued until the change of frequency has taken place at the fixed station. Previous links PLK1, and PLK2 in frequency band X, and new links NLK1 and NLK2 are indicated in FIG. 12, respectively.

Based on the motivation described above, the limit between the bursts is variable. An equalization of the transmitter powers over the whole frame is impossible, because the missing portion is necessary for the transmission with another frequency. The result is then a non-uniform distribution of noise power over one frame.

Combined Approach to Uplink and Downlink

In uncoordinated environments there cannot be excluded that the same frequency band is used for the downlink by one operator and as an uplink by another operator in the neighbourhood. In that case a non-uniform distribution of the noise power is to be taken into consideration at any rate for the two directions of transmission.

Only One Transceiver also in the Fixed Station

This may especially be cost-effective for cordless telephones as observed before. For the evaluation the situation outlined for the mobile is to be transfer to the fixed station. The basic mechanisms have already been discussed.

Selective Superpositioning

The possibility of parallel transmission at frequencies can also be extended over a longer period of time. It is then possible to select, on reception, the signal having the better quality. The transmitter powers may be reduced and even to such an extent that the sum power averaged with time may become smaller than the transmitter power with one frequency as a result of diversity recovery. Simultaneous links with more than two frequencies are possible as an extension.

I claim:

1. A CDMA transmission system comprising a plurality of stations each having a transmitter and a receiver, each transmitter being for converting an original sequence of data words which have various bit rates into a sequence of spread spectrum data words by encoding the original data words in accordance with selected code words and transmitting the spread spectrum data words; each receiver being for receiving transmitted spread spectrum data words and decoding them in accordance with the selected code words by which they were encoded, so as to recover the original sequence of data words; characterized in that said transmitter comprises:

frame generating means for compressing the data words in the original sequence into data bursts having higher bit rates and shorter durations, and including the data bursts in time slots of a sequence of data frames;

frequency spreading means coupled to the frame generating means for spreading the frequency spectrum of the data bursts by encoding them in accordance with said selected code words, the frequency spectrum of a data burst being spread, as a function of the bit rate thereof;

power control means coupled to said frequency spreading means for setting transmit power levels of the spread spectrum data bursts as a function of the bit rates thereof, higher transmit power levels being provided for data bursts which have higher bit rates; and transmission control means for controlling the compression provided by said frame generating means for each of said data words and the positioning of said data bursts in said frames, in order to substantially uniformly fill the bandwidth of each of said frames.

2. A CDMA transmission system as claimed in claim 1, wherein certain of said stations are situated in respective cellular regions of various sizes; and characterized in that each data burst produced by the frame generating means of a station in a particular cellular region is located in a data frame commencing at a position $t_0$ relative to the beginning of said data frame, said position $t_0$ being dependent upon the size of said cellular region.

3. A CDMA transmission system as claimed in claim 1, wherein certain of said stations are situated in respective cellular regions and characterized in that data bursts produced by the frame generating means of a station in a particular cellular region are located in data frames at time slots therein which result in a preferred field strength distribution in said cellular region of the transmitted spread spectrum data words.

4. A CDMA system as claimed in claim 1, characterized in that the directions of transmission between the transmitter and receiver of a station are separated as a function of time, different time slots in a data frame being variably assigned for each direction of transmission.

5. A CDMA system as claimed in claim 1, characterized in that transmission and reception between a fixed station and a mobile station is affected in different selectable frequency bands, and during changeover to a newly selected frequency band transmission and reception are simultaneously carried out over existing and newly selected frequency bands.

6. A transmitter for use in a CDMA transmission system wherein said transmitter is for converting an original sequence of data words which may have various bit rates into a sequence of spread spectrum data words by encoding the original data words in accordance with selected code words, and transmittiting the spread spectrum data words; characterized in that said transmitter comprises:

frame generating means for compressing the data words in the original sequence into data bursts having higher bit rates and shorter durations, and including the data bursts in time slots of a sequence of data frames;

frequency spreading means coupled to the frame generating means for spreading the frequency spectrum of the data bursts by encoding them in accordance with said selected code words, the frequency spectrum of a data burst being spread as a function of the bit rate thereof;

power control means coupled to said frequency spreading means for setting transmit power levels of the spread spectrum data bursts as a function of the bit rates thereof, higher transmit power levels being provided for data bursts which have higher bit rates; and transmission control means for controlling the compression provided by said frame generating means for each of said data words and the positioning of said data bursts in said frames, in order to substantially uniformly fill the bandwidth of each of said frames.

\* \* \* \* \*